United States Patent
Chacko et al.

(10) Patent No.: US 8,896,985 B2
(45) Date of Patent: Nov. 25, 2014

(54) SOLID ELECTROLYTIC CAPACITORS WITH IMPROVED RELIABILITY

(71) Applicant: Kemet Electronics Corporation, Simpsonville, SC (US)

(72) Inventors: Antony P. Chacko, Simpsonville, SC (US); Randolph S. Hahn, Simpsonville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 48 days.

(21) Appl. No.: 13/863,451

(22) Filed: Apr. 16, 2013

(65) Prior Publication Data

US 2013/0251891 A1   Sep. 26, 2013

Related U.S. Application Data

(62) Division of application No. 12/972,917, filed on Dec. 20, 2010, now Pat. No. 8,503,165.

(51) Int. Cl.
*H01G 9/00* (2006.01)
*H01G 9/012* (2006.01)
*H01G 9/042* (2006.01)
*H01G 9/15* (2006.01)
*H01G 2/06* (2006.01)

(52) U.S. Cl.
CPC ............. *H01G 9/0032* (2013.01); *H01G 9/012* (2013.01); *H01G 9/0425* (2013.01); *H01G 9/15* (2013.01); *H01G 2/065* (2013.01)
USPC ........... 361/523; 361/517; 361/525; 361/528; 361/529; 361/530

(58) Field of Classification Search
USPC ................. 361/523, 516–519, 525, 528–529, 361/502–504; 29/25.01–25.03
See application file for complete search history.

(56) References Cited

U.S. PATENT DOCUMENTS 5,142,452 A * 8/1992 Saiki .............................. 361/540
8,035,953 B2 * 10/2011 Nemoto et al. ................ 361/532

* cited by examiner

*Primary Examiner* — Nguyen T Ha
(74) *Attorney, Agent, or Firm* — Joseph T. Guy; Perkins Law Firm, LLC

(57) ABSTRACT

A capacitor with an anode, a dielectric on the anode and a cathode on the dielectric. A blocking layer is on the cathode. A metal filled layer is on said blocking layer and a plated layer is on the metal filled layer.

35 Claims, 4 Drawing Sheets

SOLID ELECTROLYTIC CAPACITORS WITH IMPROVED RELIABILITY

CROSS-REFERENCE TO RELATED APPLICATIONS

The present application is a divisional application of pending U.S. patent application Ser. No. 12/972,917 filed Dec. 20, 2011 which is, in turn, a continuation-in-part of U.S. patent application Ser. No. 12/469,786 filed May 21, 2009 now as U.S. Pat. No. 8,310,816 issued Nov. 13, 2012 which is incorporated herein by reference

BACKGROUND

The present invention is related to an improved method of forming a solid electrolyte capacitor and an improved capacitor formed thereby. More specifically, the present invention is related to an improved method of electrically connecting a cathode to a cathode lead in a capacitor and an improved capacitor formed thereby.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as 7,7',8,8'-tetracyanoquinonedimethane (TCNQ) complex salt, or intrinsically conductive polymers, such as polyaniline, polypyrol, polythiophene and their derivatives. The solid cathode electrolyte is applied so that it covers all dielectric surfaces. An important feature of the solid cathode electrolyte is that it can be made more resistive by exposure to high temperatures. This feature allows the capacitor to heal leakage sites by Joule heating. In addition to the solid electrolyte the cathode of a solid electrolyte capacitor typically consists of several layers which are external to the anode body. In the case of surface mount constructions these layers typically include: a carbon layer; a metal filled layer containing a highly conductive metal, typically silver, bound in a polymer or resin matrix; a conductive adhesive layer such as silver filled adhesive; and a highly conductive metal lead frame. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or spray techniques with other less desirable techniques being reported.

The carbon layer serves as a chemical barrier between the solid electrolyte and the metal filled layer. Critical properties of the layer include adhesion to the underlying layer, wetting of the underlying layer, uniform coverage, penetration into the underlying layer, bulk conductivity, interfacial resistance, compatibility with the silver filled layer, buildup, and mechanical properties.

The silver filled layer serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties. Compatibility with the subsequent layers employed in the assembly and encapsulation of the capacitor are also critical. In the case where a silver filled adhesive is used to attach to a lead frame compatibility between the lead frame and the silver filled adhesive is necessary. In capacitors which utilize solder to connect to the external lead, solderability and thermal stability are important factors. In order for the solder to wet the metal filled layer, the resin in the metal filled layer must degrade below the temperature at which the solder is applied. However, excessive degradation of the resin creates an effect termed "silver leeching" resulting in a poor connection between the external cathode layers and the external cathode lead. The traditional approach to applying a silver filled layer requires a delicate compromise in thermal stability of the resin in order to simultaneously achieve solder wetting and to avoid silver leeching. The silver filled layer is secured to a cathode lead frame by an adhesive. The adhesive is typically a silver filled resin which is cured after the capacitor is assembled.

Reliability of the capacitors requires that the interface between the silver filled layer and carbon layer, and the interface between the silver filled layer and adhesive layer, have good mechanical integrity during thermo mechanical stresses. Solid electrolytic capacitors are subject to various thermomechanical stresses during assembly, molding, board mount reflow etc. A weak interface with the silver filled layer can cause delamination of the layers which causes reliability issues. Solid electrolytic capacitors are also required to have good environmental properties such as good chemical and moisture resistance. Reliability issues caused by silver migration under humid conditions are known in the electronics industry. Silver metal from the silver filled layer can migrate to the anode causing high leakage current.

U.S. Pat. Nos. 4,000,046, and 4,104,704 teach an electroplating method for solid electrolytic capacitors. Electroplating was performed on water based graphite coatings and silver paint coatings. Experiments to reproduce the method of this disclosure showed significant reliability issues such as high leakage current and electrical shorts. Investigations to understand this suggest that the diffusion of the plating electrolyte through this hydrophilic and porous conductive layer to the semi conductive layer and anode is influencing the reliability. It is also found that the top of the anode with no carbon layer provides significantly more permeability for the plating electrolyte diffusion.

Silver filled coatings are used in solid electrolytic capacitors for current collection from the cathode. Highly conductive silver filled coatings enable lower ESR compared to other metal particle filled coatings. However, the capacitors using these polymeric cathode coatings systems suffer from ESR shift on exposure to Surface Mount Technology (SMT) conditions. During board mount the capacitors are subjected to elevated temperatures which create stresses in the interfaces due to coefficient of thermal expansion (CTE) mismatches. This stress causes delamination and thus an increased ESR in the finished capacitor.

There has been an ongoing desire for a capacitor which has a high conductivity layer, for low ESR, which can be surface mounted without detriment to the ESR. The present invention provides such a capacitor.

SUMMARY

It is an object of the present invention to provide a solid electrolytic capacitor with improved reliability by improving the layers between the cathode and lead frame.

A particular feature of the improved cathode is the improved reliability.

Another advantage is the low ESR which can be achieved and a decrease in the ESR shift which typically occurs upon surface mounting.

These and other advantages, as will be realized, are provided in an improved a capacitor. The capacitor has an anode, a dielectric on the anode and a cathode on the dielectric. The capacitor also has a plated metal layer a blocking layer between the cathode and plated metal layer.

Yet another embodiment is provided in a method for forming a capacitor. The method includes the steps of:
providing an anode;
forming a dielectric on the anode;
applying a cathode on the dielectric;
applying a blocking layer; and
plating a metal layer.

DETAILED DESCRIPTION

The present invention mitigates the deficiencies of the prior art by providing a blocking layer and plated metal layer between the cathode and the lead frame. The blocking layer increases productivity without detriment to the electrical properties of the capacitor. The present invention will be described with reference to the various figures which illustrate, without limiting, the invention. Throughout the description similar elements will be numbered accordingly.

By the method of this invention, the inventors discovered that ultra low ESR can be achieved by metal plating, preferably nickel plating, in concert with a blocking layer. This method mitigates the ESR shift typically observed with SMT and on exposure to humidity. Furthermore, an additional protective layer, in addition to the blocking layer, further reduces ESR shift.

Figure 1:
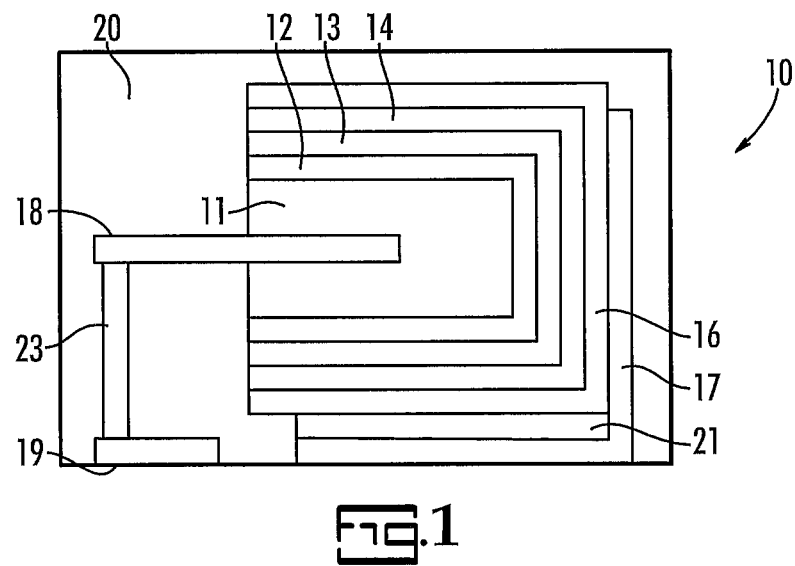
FIG. 1 is a cross-sectional schematic view of a prior art capacitor.

FIG. 1 illustrates a cross-sectional schematic view of a prior art capacitor generally represented at 10. The capacitor comprises an anode, 11, preferably comprising a valve metal as described further herein with an anode wire, 18, extending there from or attached thereto. A dielectric layer, 12, is provided on the surface of the anode, 11. Coated on the surface of the dielectric layer, 12, is a cathode layer, 13. A carbon layer, 14, and metal filled layer, 16, provide electrical conductivity and provide a surface which is more readily adhered to the cathode terminal, 17, than is the cathode layer, 13. An adhesive layer, 21, secures the cathode lead to the cathode terminal. The anode wire, 18, is electrically connected to the anode terminal, 19, by a connector, 23, which may be integral to a lead frame. The entire element, except for the terminus of the terminals, is then preferably encased in a non-conducting material, 20, such as an epoxy resin.

Figure 2:
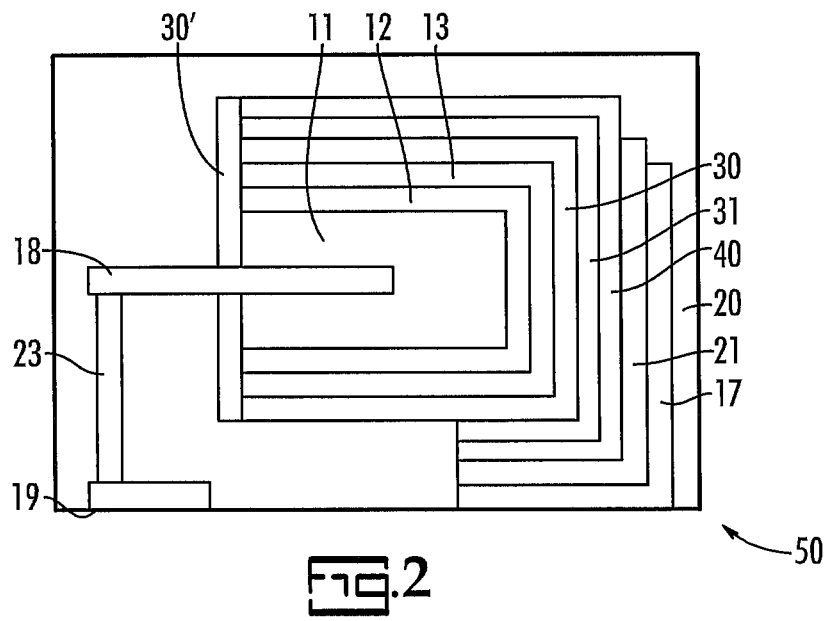
FIG. 2 is a cross-sectional schematic view of an embodiment of the invention.

An embodiment of the present invention is illustrated schematically in FIG. 2 at 50. In FIG. 2 the anode, 11; dielectric, 12; cathode, 13; cathode termination, 17; anode wire, 18; anode termination, 19; non-conducting material, 20; and connector, 23, are as illustrated relative to FIG. 1. A metal filled layer, 31, preferably a silver filled layer, is on the blocking layer, 30, and a metal layer, 40, is on the metal filled layer. The blocking layer comprises at least one layer selected from the group consisting of a hydrophobic layer, an insulative layer and a carbon layer in a crosslinked matrix. The blocking layer inhibits migration of metals and metal ions towards the dielectric. In a particularly preferred embodiment the blocking layer is between first and second carbon layers. The blocking layer preferably encases the entire underlying structure. A second blocking layer, 30', is preferably disposed on at least a portion of the surface of the underlying monolith from which the anode wire, 18, extends. The second blocking layer may be the same as the blocking layer. Alternatively, the second blocking layer may be a layer which is different from the blocking layer.

The function of the blocking layer is to inhibit metal and metal ions from migrating there through without significant degradation in electrical conduction therethrough. Each surface of the blocking layer must be compatible with the layer attached thereto. A metallic layer, 40, on the metal filled layer provides improvements in ESR without detrimental change when surface mounted.

Figure 3A:
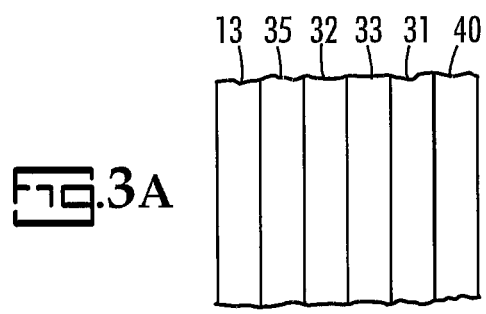
FIGS. 3A-3C are a partial cross-sectional schematic views of embodiments of the present invention.

An embodiment of the invention is illustrated in FIG. 3A wherein a cross-sectional portion with the cathode, 13, metallic layer, 40, and layers there between shown in isolation. In the embodiment of FIG. 3A a first carbon layer, 35, is in contact with the cathode and the layer is formulated to adhere adequately to the cathode while still having adequate conductivity through the layer. The blocking layer, 32, inhibits the metal ion in the electroplating electrolyte from migrating into or through the blocking layer. It is preferred that no metal migrates through the blocking layer. In practice, minute amounts may migrate which is undesirable but acceptable. A second carbon layer, 33, is formulated to provide adhesion to the blocking layer and to the metal filled layer, 31. A metallic layer, 40, is on the metal filled layer. The metallic layer, 40, is the eventual contact point within a circuit and is electrically connected to a cathode lead or to a circuit trace preferably by a conductive adhesive.

Figure 3B:
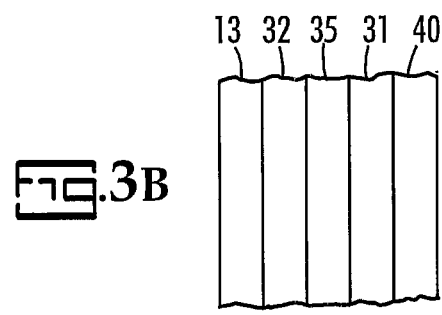
Figure 3C:
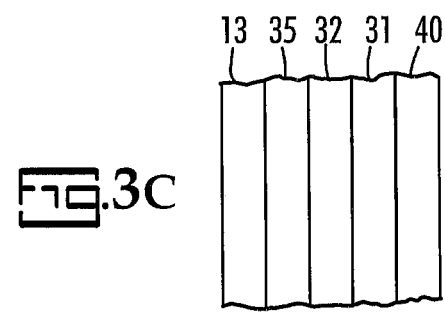

Another embodiment of the invention is illustrated in FIG. 3B wherein a cross-sectional portion with the cathode, 13, metallic layer, 40, and layers there between shown in isolation. In FIG. 3B the blocking layer, 32, is between the cathode, 13, and the carbon layer, 35. This embodiment has the advantage of requiring one less layer. A related embodiment is illustrated in FIG. 3C wherein the blocking layer, 32, is between the carbon layer, 35, and the metal filled layer, 31.

Figure 6:
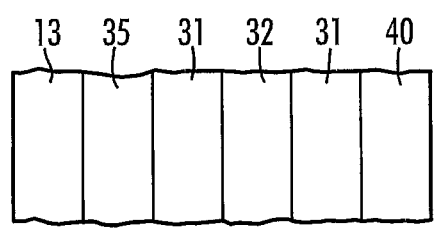
FIG. 6 is a partial cross-sectional view of an embodiment of the present invention.

Another embodiment of the invention is illustrated in FIG. 6. In FIG. 6, a carbon layer, 35, is on the cathode, 13. Metal filled layers, 31, sandwich a blocking layer, 32, and a metallic layer, 40, is on the outermost metal filled layer.

The cathode layer is a conductive layer preferably comprising conductive polymer, such as polythiophene, polyaniline, polypyrrole or their derivatives; manganese dioxide, lead oxide or combinations thereof. An intrinsically conducting polymer is most preferred.

A particularly preferred conducting polymer is illustrated in Formula I:

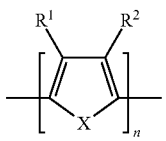

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates. A particularly preferred polymer is 3,4-polyethylene dioxythiophene (PEDT). The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

The first carbon layer and second carbon layer, which may be the same or different, each comprises a conductive composition comprising at least 5% resin by dry weight and conductive carbon particles. More preferably the conductive composition comprises at least 20% resin by dry weight. Each carbon layer may individually also comprise adjuvants such as crosslinking additives, surfactants and dispersing agents. The resin, conductive carbon particles and adjuvants are preferably dispersed in an organic solvent or water to form a coating solution. The solvent and resin for the first conductive carbon layer needs to have good wettability to the semi-conductive cathode surface.

The blocking layer comprises at least one layer selected from the group consisting of a hydrophobic layer, an insulating layer and a layer comprising carbon in a crosslinked matrix.

The blocking layer is most preferably less than two microns thick. Above about two microns the resistivity of the layer exceeds acceptable limits thereby defeating one of the purposes of the blocking layers. The lower limit of thickness is set by the coating technique with a monolayer on the entire surface being the theoretical limit. This theoretical limit is difficult to reach with most coating techniques due to the presence of surface vacancies wherein the blocking properties are compromised. Since the blocking layer may be a poorly conducting layer its presence may increase resistance between the cathode and cathode lead which is undesirable.

The hydrophobic coating preferably comprises hydrophobic polymers. Silicone and their copolymers, fluorinated polymers and their copolymers are mentioned as being particularly preferred. The hydrophobic layer may include fillers such as silica. Nanoclay and related materials modified with a hydrophobic coating is particularly suitable for demonstration of the invention. The hydrophobic coating is preferably a thermoset coating with high cross link density. The hydrophobic coating is chosen such that the plating electrolyte has very low wettability to the coated surface. In addition to providing low wettability the high cross link density prevents diffusion of plating electrolyte through this coating layer.

The layer comprising carbon in a crosslinked matrix comprises conductive carbon particles with particularly preferred carbon particles selected from graphite, carbon black, carbon nanotubes and graphene. The carbon is in a matrix of crosslinked resin wherein the preferred resins are polymers of materials selected from the group phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles, polybenzothiazoles, and silicones such as silicone polyester and silicone epoxy. More preferably the resin is selected from cellulose derivatives, acrylic, polyester, aromatic cyanate ester, epoxy, phenolic, diallyl isophthalate, phenoxy, polyimide and bismaleimide. The resin is preferably chemically crosslinked.

A second carbon layer is preferably applied over the blocking layer. Since the blocking layer is designed to have low wettability to aqueous based systems, a water based carbon coating has very low adhesion to this surface. A solvent based carbon coating is preferred for this application. The solvent and resin of the carbon coating is chosen such that the coating can adequately wet the blocking layer which is typically a hydrophobic surface. In addition to wetting, the binder of the second carbon coating needs to have strong adhesion to the binder in the blocking layer as well as to the metal filled layer. In addition to the carbon particles such as graphite, carbon black, carbon nanotubes, graphene, metal particles can also be added to improve conductivity.

Preferred resins for the carbon layers are polymers of materials selected from the group phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles, polybenzothiazoles, and silicones such as silicone polyester and silicone epoxy. More preferably the resin is selected from cellulose derivatives, acrylic, polyester, aromatic cyanate ester, epoxy, phenolic, diallyl isophthalate, phenoxy, polyimide and bismaleimide.

The plated metal layer is preferably applied to the metal filled layer. Plating can be done with various metallic systems. Nickel is a preferred metal system. Plating can be done either by electroplating or electroless plating. Electroplating is preferred due to the lower production cycle time. Conductive adhesive is typically used to adhesively attach the metal layer to the lead frame which acts as the cathode lead or to a circuit trace. The thickness of the plated metal layer is preferably at least 2 microns to no more than 100 microns. Below about 2 microns there may not be complete coverage of the capacitor with nickel due to surface roughness of the underlying cathode. Above about 100 microns there is no further advantage offered and any additional material increases material cost and processing time.

Figure 4:
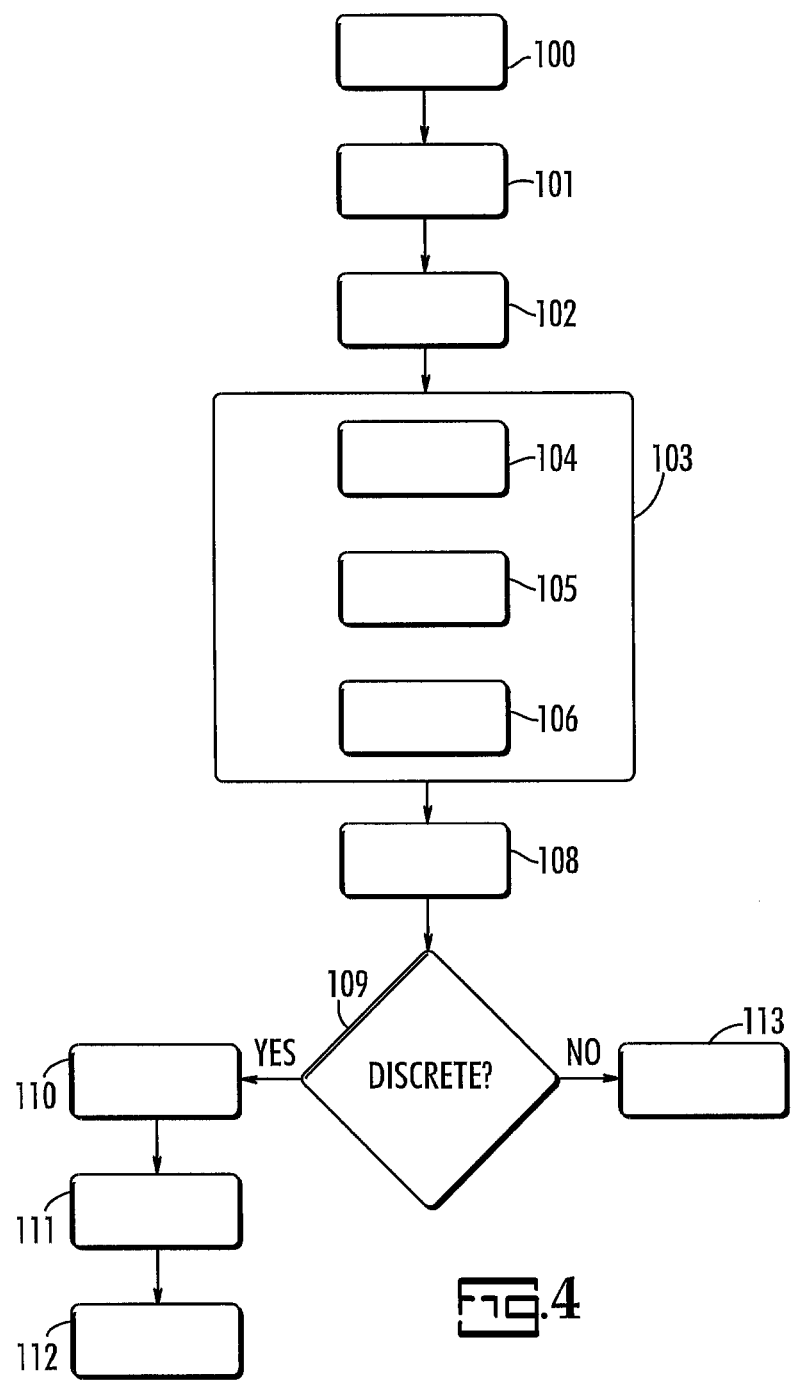
FIG. 4 is a schematic illustration of an embodiment of the present invention.

A preferred process for forming the capacitor is illustrated in FIG. 4.

In FIG. 4, the anode is formed, 100, preferably from a valve metal as described further herein.

The anode is a conductor preferably selected from a valve metal or a conductive metal oxide. More preferably the anode comprises a valve metal, a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. Conductive polymeric materials may be employed as an anode material. Particularly preferred conductive polymers include polypyrrole, polyaniline and polythiophene. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The anode is preferably etched to increase the surface area, particularly, if the anode is a valve metal foil such as aluminum foil. Etching is preferably done by immersing the anode into at least one etching bath. Various etching baths are taught in the art and the method used for etching the anode is not limited herein.

The anode wire is preferably attached to the anode, particularly when a compact is employed. The anode wire can be attached by welding or by embedding into the powder prior to pressing. A valve metal is a particularly suitable anode wire and in a preferred embodiment the anode and anode wire are the same material.

A dielectric is formed, 101, on the surface of the anode. The dielectric is a non-conductive layer which is not particularly limited herein. The dielectric may be a metal oxide or a ceramic material. A particularly preferred dielectric is the oxide of a metal anode due to the simplicity of formation and ease of use. The dielectric layer is preferably an oxide of the valve metal as further described herein. It is most desirable that the dielectric layer be an oxide of the anode. The dielectric is preferably formed by dipping the anode into an electrolyte solution and applying a positive voltage to the anode. Electrolytes for the oxide formation are not particularly limiting herein but exemplary materials can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the dielectric on the anode including aqueous solutions of dicarboxylic acids, such as ammonium adipate are also known. Other materials may be incorporated into the dielectric such as phosphates, citrates, etc. to impart thermal stability or chemical or hydration resistance to the dielectric layer.

A conductive layer is formed, 102, on the surface of the dielectric. The conductive layer acts as the cathode of the capacitor. The cathode is a conductor preferably comprising at least one conductive material selected from manganese dioxide and a conductive polymeric material. Particularly preferred conductive polymers include polypyrrole, polyaniline and polythiophene. Metals can be employed as a cathode material with valve metals being less preferred.

After conductive cathode layer formation, 102, the layers between the cathode and metal plated layer are formed, 103. At least one blocking layer is applied, 105, by spraying or dipping. It is preferably that at least one carbon layer is applied, 104, and at least one silver filled layer, 106, is applied both preferably by spraying or dipping. The blocking layer can be on either side of a carbon filled layer or on either side of a metal filled layer.

A metal plated layer is formed at 108, preferably, onto a metal filled layer and preferably by electroplating or electroless plating. In a preferred embodiment the metal plated layer is formed by reverse bias wherein the positive electroplating electrode is electrically connected to the capacitors cathode and the negative electroplating electrode is electrically connected to the anode lead.

The capacitor may be a discrete capacitor or an embedded capacitor. If a discrete capacitor is to be formed, at 109, a conductive adhesive is added, 110, and the metal layer is adhered to a cathode lead, 111. The capacitor is finished, 112, which may include incorporating anode and cathode terminals, external insulation, testing, packing and the like as known in the art.

If the capacitors are to be employed in an embedded application or attached directly to a circuit trace the capacitors are finished, 113, which may include testing, packing and the like.

Figure 5:
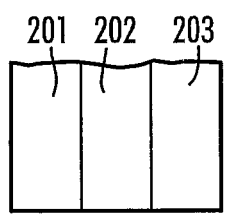
FIG. 5 is a partial cross-sectional view of an embodiment of the present invention.

An embodiment of the invention is illustrated in partial cross-sectional view in FIG. 5. In FIG. 5, a cathode, 201, comprises a blocking layer, 202, between the cathode, 201, and a metal filled layer, 203.

The capacitor is illustrated herein as a discrete capacitor for convenience and this is a preferred embodiment. In another preferred embodiment the anode wire and metallic layer may be in direct electrical contact with a circuit trace wherein elements of the circuit may constitute the cathode lead, anode lead or both. In another preferred embodiment the capacitor may be embedded in a substrate or incorporated into an electrical component with additional functionality.

A metallic layer on the silver filled polymer cathode coating layer offers a number of advantages. There is an ESR Shift reduction upon surface mounting technology (SMT) application. The metallic layer significantly reduces ESR shift by preventing the SMT stresses from transferring to the cathode layers. In addition, the coefficient of thermal expansion (CTE) mismatch significantly decreases due to similar CTE between lead frame and the metal layer.

There is lower edge resistance with very thin silver coating. The thin metallic layer offers continuous path for current collection even when the silver paint is not covered at edges and corners of capacitor.

The metal layer provides improved humidity performance. When plating alone is used for metallization, some metallic plating can form insulative complex formation with PEDT polymerization residues causing increased ESR on high temperature high humidity. The presence of a silver coating inhibit this and offers improved ESR stability. A particular advantage of the improved humidity performance is that a metal filled layer is less susceptible to migration due to humidity.

EXAMPLES

Example 1

A series of identical tantalum anodes was prepared. The tantalum was anodized to form a dielectric on the tantalum anode in identical fashion. In one set of samples a manganese dioxide cathode was formed on the dielectric with first carbon layer comprising graphite dispersion in acrylic solution was applied. The capacitors with manganese dioxide cathodes were split into three groups. In a first control group a nickel plated layer was formed on the first carbon. In the second control group a silver layer was formed on the first carbon. In the inventive group a hydrophobic coating comprising silicone polymer solution was applied on the first carbon layer. A second carbon layer comprising a mixture of carbon black and graphite dispersion in a polyester binder was applied on the hydrophobic layer. A nickel plated layer was formed on the second carbon by electroplating. Both control and hydrophobic layer samples were dried and electrical properties were measured. The results are presented in Table 1.

TABLE 1

| | Leakage (microamps) | ESR (mohms) |
| --- | --- | --- |
| Plated Layer | 536 | 115 |
| Silver Layer | 1.3 | 57.6 |
| Hydrophobic Layer | 1.25 | 42.8 |

Table 1 clearly illustrates the advantages of the hydrophobic layer, particularly, with regards to a decrease in leakage current and ESR.

Example 2

On an identical set of samples a polymeric cathode was formed utilizing polyethylenedioxythiophene (PEDT) with carbon layers applied thereto respectively. The capacitors with PEDT cathodes were split into three groups. In a control group a nickel plated layer was formed on a first carbon layer comprising carbon black and graphite dispersion in a polyester binder solution. In the second control group, a carbon and silver layer was applied on a PEDT cathode. In the inventive group a hydrophobic coating comprising a silicone polymer solution was applied on the first carbon layer. A second carbon layer, similar to the second carbon layer of Example 1, was applied on the hydrophobic layer. A nickel plated layer was formed on the second carbon by electroplating. Both control and hydrophobic layer samples were dried and electrical properties were measured. The results are provided in Table 2.

TABLE 2

| | Leakage (microamp) | ESR (mohms) |
| --- | --- | --- |
| Plated Layer | 312.5 | 41.93 |
| Silver Layer | 3.01 | 47.6 |
| Hydrophobic Layer | 0.95 | 66.5 |

Table 2 clearly illustrates the advantages offered by the hydrophobic layer, particularly, with regards to leakage current.

Example 3

On an identical set of samples a polymeric cathode was formed utilizing polyethylenedioxythiophene (PEDT) polymers. The capacitors with PEDT cathodes were split into three groups. In the first control group a carbon layer was applied on PEDT followed with Nickel plating. In a second control group a carbon and silver layer was applied on the PEDT cathode. In the inventive group, a hydrophobic layer comprising silicone polymer solution was applied on the PEDT cathode. No carbon layer was applied in the group comprising the hydrophobic layer. A nickel plated layer was formed on the hydrophobic layer by electroplating.

Both control and hydrophobic layer samples were dried and electrical properties were measured. The results are provided in Table 3.

TABLE 3

| | Leakage (microamps) | ESR (mohms) |
| --- | --- | --- |
| Plated Layer | 85.44 | 18.98 |
| Silver Layer | 5.108 | 22.8 |
| Hydrophobic Layer | 2.67 | 19.3 |

Table 3 clearly illustrates the advantages offered by the hydrophobic layer, particularly, with regards to leakage current and ESR.

Example 4

Two low ESR capacitor part types of 12 mohm and 9 mohm were chosen for this study. On an identical set of samples a polymeric cathode was formed utilizing polyethylenedioxythiophene (PEDT) polymers. The capacitors with PEDT cathodes were split into two groups. In the first control group a carbon layer was applied on PEDT followed by silver layer application. In the inventive group, a carbon layer and a silver layer was applied onto the cathode layer followed by electroplating onto the silver layer. It can seen that a lower ESR after SMT was obtained in the inventive group. The results are presented in Table 4.

TABLE 4

| | Control (mohm) | Inventive (mohm) |
| --- | --- | --- |
| 12 mohm group | | |
| ESR after encapsulation | 10.77 | 10.85 |
| ESR after SMT pass 1 | 13.83 | 12.03 |

TABLE 4-continued

| | Control (mohm) | Inventive (mohm) |
|---|---|---|
| ESR after SMT pass 2 | 14.4 | 12.29 |
| ESR shift | 3.63 | 1.44 |
| 8 mohm group | | |
| ESR after encapsulation | 9.3 | 8.06 |
| ESR after SMT pass 1 | 12.38 | 9.02 |
| ESR after SMT pass 2 | 12.71 | 9.44 |
| ESR shift | 3.41 | 1.38 |

Example 5

A 12 mohm ESR part type was chosen for this humidity exposure study. On an identical set of samples a polymeric cathode was formed utilizing polyethylenedioxythiophene (PEDT) polymers. The capacitors with PEDT cathodes were split into two groups. In the first control group a carbon layer was applied on PEDT followed by a Nickel plated layer. In the inventive group, a carbon layer as the blocking layer and a silver layer was applied onto the cathode layer followed by nickel plating onto the silver layer. Both control and inventive parts were subjected to long term humidity test at 60° C., 90% relative humidity for 1000 hrs. The results are presented in Table 5.

TABLE 5

| | Control (mohm) | Inventive (mohm) |
|---|---|---|
| ESR before humidity test | 16.11 | 12.78 |
| ESR after humidity test | 32.74 | 16.97 |
| ESR shift | 16.63 | 4.19 |

As indicated in the results the combination of a blocking layer and a nickel plated layer provides a capacitor with an ESR of less than 20 mohm and more preferably less than 15 mohm.

The invention has been described with particular emphasis on the preferred embodiments. One of skill in the art would realize additional embodiments, alterations, and advances which, though not enumerated, are within the invention as set forth more specifically in the claims appended hereto.

Claimed is:

1. A method for forming a capacitor comprising the steps of:
   providing an anode;
   forming a dielectric on said anode;
   applying a cathode on said dielectric;
   applying a blocking layer;
   applying a metal filled layer; and
   plating a metal layer wherein said plating is by a method selected from the group consisting of electroplating and electroless plating.

2. The method for forming a capacitor of claim 1 further comprising applying a metal filled layer.

3. The method for forming a capacitor of claim 2 wherein said applying a metal filled layer is prior to said applying a blocking layer.

4. The method for forming a capacitor of claim 2 wherein said metal filled layer comprises silver.

5. The method for forming a capacitor of claim 1 wherein said plating a metal layer comprises plating a nickel layer.

6. The method for forming a capacitor of claim 1 comprising plating said metal layer at a thickness of 2 microns to 100 microns.

7. The method for forming a capacitor of claim 1 wherein said plating a metal layer is done with reverse bias.

8. The method for forming a capacitor of claim 1 wherein said blocking layer prevents diffusion of electrolyte.

9. The method for forming a capacitor of claim 1 wherein said blocking layer comprises at least one layer selected from the group consisting of a hydrophobic layer, an insulative layer and a layer comprising carbon in a crosslinked matrix.

10. The method for forming a capacitor of claim 9 wherein said hydrophobic layer comprises a crosslinked polymer.

11. The method for forming a capacitor of claim 10 wherein said hydrophobic layer comprises conductive carbon.

12. The method for forming a capacitor of claim 9 wherein said insulative coating comprises at least one of a hydrophobic polymer and a hydrophobic additive.

13. The method for forming a capacitor of claim 9 wherein said insulative coating comprises a thermoset polymer.

14. The method for forming a capacitor of claim 1 further comprising applying a first conductive carbon layer.

15. The method for forming a capacitor of claim 14 further comprising applying a second conductive layer.

16. The method for forming a capacitor of claim 15 wherein said second conductive layer is a second conductive carbon layer.

17. The method for forming a capacitor of claim 15 wherein said blocking layer is applied between said applying a first conductive carbon layer and said applying a second conductive layer.

18. The method for forming a capacitor of claim 15 wherein at least one of said first conductive layer and said second conductive layer comprises carbon particles selected from the group consisting of graphite, carbon black, carbon nanotubes and graphene.

19. The method for forming a capacitor of claim 15 wherein said second conductive layer further comprises metal particles.

20. The method for forming a capacitor of claim 14 wherein said blocking layer is between said first conductive carbon layer and a silver filled layer.

21. The method for forming a capacitor of claim 1 wherein said blocking layer is between two silver filled layers.

22. The method for forming a capacitor of claim 1 wherein said cathode comprises at least one of $MnO_2$ or a conductive polymer.

23. The method for forming a capacitor of claim 1 further comprising attaching a cathode lead to said plated layer.

24. The method for forming a capacitor of claim 1 wherein said blocking layer comprises a polymer.

25. The method for forming a capacitor of claim 24 wherein said polymer is a polymer of at least one monomer selected from fluorinated monomer and silicone monomer.

26. The method for forming a capacitor of claim 1 wherein said blocking layer prevents diffusion of electrolyte into said anode.

27. The method for forming a capacitor of claim 1 wherein said blocking layer encases said cathode and said dielectric.

28. The method for forming a capacitor of claim 27 wherein said blocking layer encases a portion of an anode wire.

29. The method for forming a capacitor of claim 1 wherein said blocking layer is less than two microns thick.

30. The method for forming a capacitor of claim 1 wherein said blocking layer comprises a crosslinked polymer.

31. The method for forming a capacitor of claim 1 further comprising applying a second blocking layer.

32. The method for forming a capacitor of claim 31 wherein said second blocking layer is applied prior to said plating.

33. The method for forming a capacitor of claim 31 wherein said second blocking layer is applied to a surface with an anode wire extending there from.

34. The method for forming a capacitor of claim 1 further comprising electrically connecting a cathode termination to said plated metal layer.

35. The method for forming a capacitor of claim 1 comprising plating said metal filed layer at a thickness of 1 micron to 50 microns.

* * * * *